(12) United States Patent
Takahashi et al.

(10) Patent No.: US 10,086,631 B2
(45) Date of Patent: Oct. 2, 2018

(54) LABEL WINDING DEVICE AND PRINTING SYSTEM

(71) Applicant: Oki Data Corporation, Tokyo (JP)

(72) Inventors: Hiromi Takahashi, Tokyo (JP); Mihoko Odate, Tokyo (JP); Syuji Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/133,219

(22) Filed: Apr. 19, 2016

(65) Prior Publication Data

US 2016/0318321 A1 Nov. 3, 2016

(30) Foreign Application Priority Data

Apr. 28, 2015 (JP) ................................. 2015-091083

(51) Int. Cl.
  *B41J 15/16* (2006.01)
  *B31D 1/02* (2006.01)
  (Continued)

(52) U.S. Cl.
  CPC .............. *B41J 15/16* (2013.01); *B31D 1/021* (2013.01); *B31D 1/027* (2013.01); *B41J 3/4075* (2013.01); *B65C 9/0015* (2013.01); *B65C 9/40* (2013.01); *B65H 23/048* (2013.01); *B65H 23/198* (2013.01); *B65H 23/1955* (2013.01); *B65H 26/025* (2013.01); *B31D 2201/02* (2013.01); *B32B 38/10* (2013.01); *B32B 43/006* (2013.01);
  (Continued)

(58) Field of Classification Search
  CPC . B32B 38/10; B32B 43/006; Y10T 156/1174; Y10T 156/1195; Y10T 156/195; Y10T 156/1956; Y10T 156/1994; B31D 1/02; G09F 2003/0225; G09F 2003/0227
  USPC .......................... 156/715, 719, 759, 760, 767
  See application file for complete search history.

(56) References Cited

U.S. PATENT DOCUMENTS 3,436,954 A * 4/1969 Eppler .................. G01B 5/043
  33/732
3,574,026 A * 4/1971 Kucheck ................ B31D 1/021
  156/152

(Continued)

FOREIGN PATENT DOCUMENTS

DE 7404495 U 2/1976
GB 2012455 A 7/1979

(Continued)

*Primary Examiner* — Mark A Osele
*Assistant Examiner* — Nickolas Harm
(74) *Attorney, Agent, or Firm* — Rabin & Berdo, P.C.

(57) ABSTRACT

A label winding device is for receiving a medium including a label liner and a label member that is removably attached to the label liner and has at least one label portion and a waste portion, separating the waste portion from the label liner at a waste separation portion, and winding the at least one label portion with the label liner. The label winding device includes: a waste winder for winding the separated waste portion; a label winder for winding the at least one label portion with the label liner without the separated waste portion; a waste guide for guiding the separated waste portion to the waste winder; a support for rotatably supporting the waste guide; a sensor for detecting a rotational speed of the waste guide; and a waste break detector for detecting break of the waste portion on a basis of the detection by the sensor.

16 Claims, 12 Drawing Sheets

(51) Int. Cl.
*B65H 23/195* (2006.01)
*B65H 26/02* (2006.01)
*B65C 9/00* (2006.01)
*B65C 9/40* (2006.01)
*B41J 3/407* (2006.01)
*B65H 23/04* (2006.01)
*B65H 23/198* (2006.01)
*B32B 43/00* (2006.01)
*G09F 3/02* (2006.01)
*G09F 3/00* (2006.01)
*G09F 3/10* (2006.01)
*B32B 38/10* (2006.01)
*B41J 2/01* (2006.01)
*G03G 15/00* (2006.01)

(52) U.S. Cl.
CPC ....... *B41J 2/01* (2013.01); *B65H 2301/51122* (2013.01); *B65H 2553/416* (2013.01); *B65H 2553/51* (2013.01); *B65H 2701/19404* (2013.01); *G03G 15/00* (2013.01); *G09F 3/02* (2013.01); *G09F 3/0291* (2013.01); *G09F 3/0297* (2013.01); *G09F 3/10* (2013.01); *G09F 2003/023* (2013.01); *G09F 2003/0226* (2013.01); *G09F 2003/0255* (2013.01); *Y10T 156/1158* (2015.01); *Y10T 156/1168* (2015.01); *Y10T 156/1195* (2015.01); *Y10T 156/1917* (2015.01); *Y10T 156/1994* (2015.01)

(56) References Cited

U.S. PATENT DOCUMENTS

| | | | | |
|---|---|---|---|---|
| 3,966,534 | A | | 6/1976 | Oddy |
| 4,282,056 | A | * | 8/1981 | Okui ................... B26D 7/1827 118/37 |
| 4,346,855 | A | * | 8/1982 | Biggar, III .......... B26D 7/1827 156/267 |
| 4,775,086 | A | | 10/1988 | Kataoka |
| 5,064,130 | A | * | 11/1991 | Blaimschein .......... B26D 7/086 156/384 |
| 5,351,426 | A | * | 10/1994 | Voy ........................ B31D 1/021 40/630 |
| 6,592,693 | B1 | * | 7/2003 | Nedblake ........... B23K 26/0846 156/247 |
| 2001/0011574 | A1 | * | 8/2001 | Onishi .................... B26D 1/225 156/250 |
| 2002/0108709 | A1 | * | 8/2002 | Fukada .................. B65H 23/32 156/719 |
| 2003/0029562 | A1 | * | 2/2003 | Yotsumoto ........... B09B 3/0058 156/701 |
| 2003/0089452 | A1 | * | 5/2003 | Hansen ................. B65C 9/1803 156/268 |
| 2014/0299278 | A1 | * | 10/2014 | Previty ................. B32B 43/006 156/719 |

FOREIGN PATENT DOCUMENTS

| | | |
|---|---|---|
| GB | 2120170 A | 11/1983 |
| JP | 2004-058560 A | 2/2004 |
| JP | 2008-044171 A | 2/2008 |

* cited by examiner

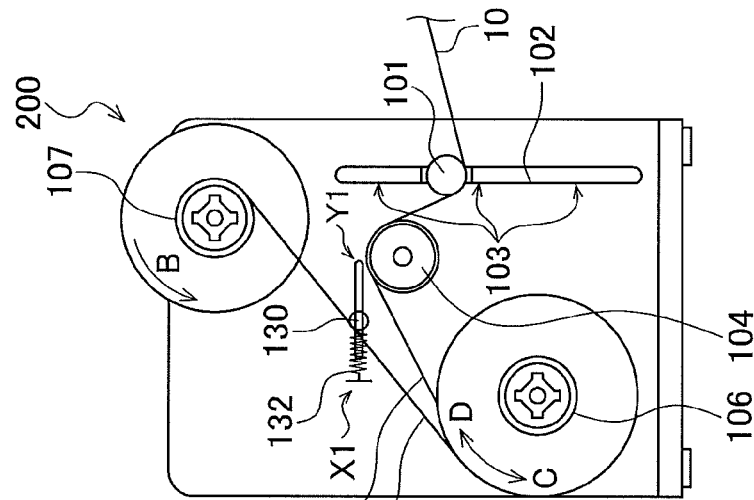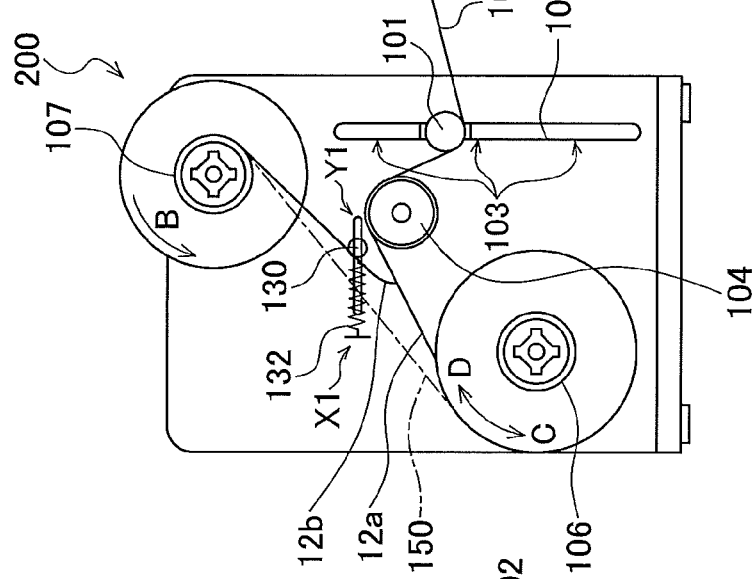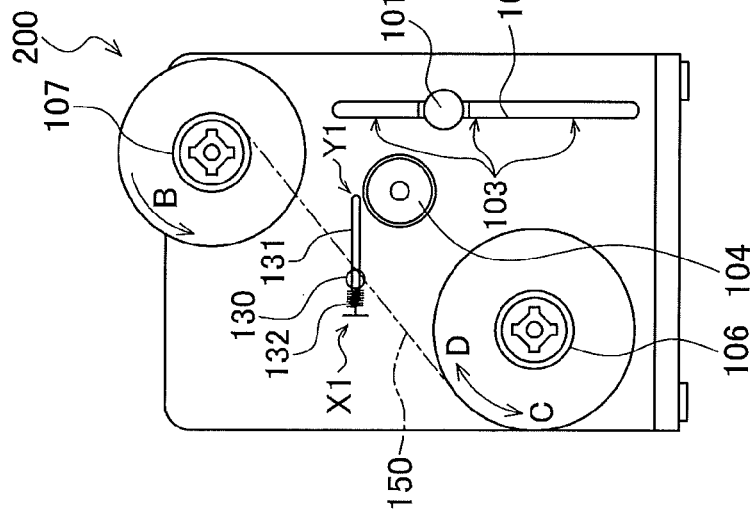

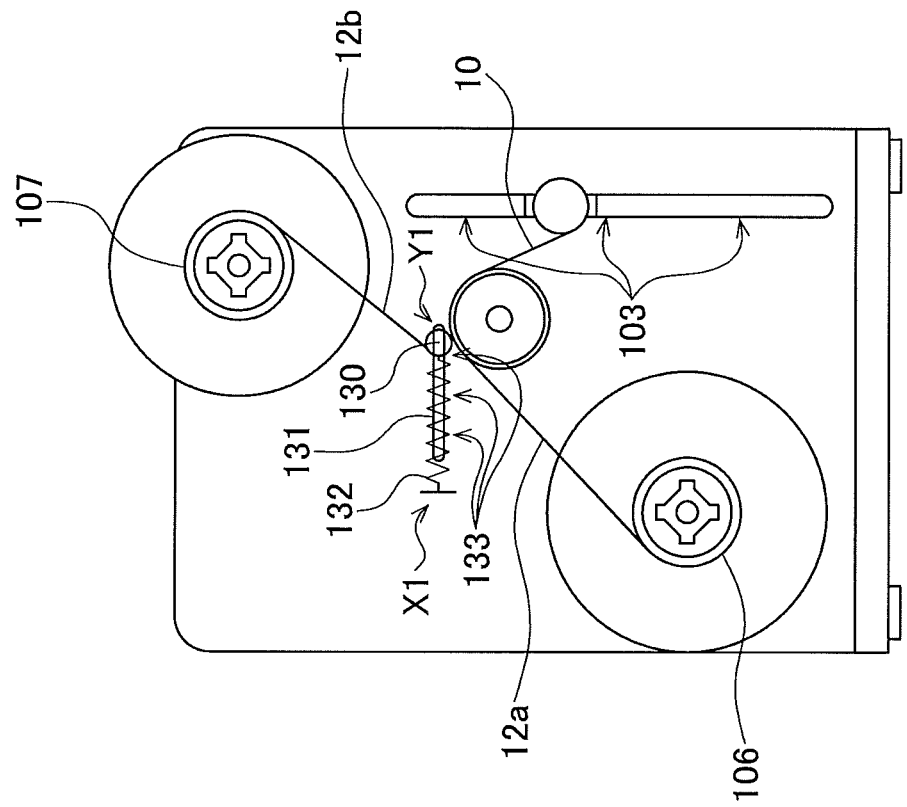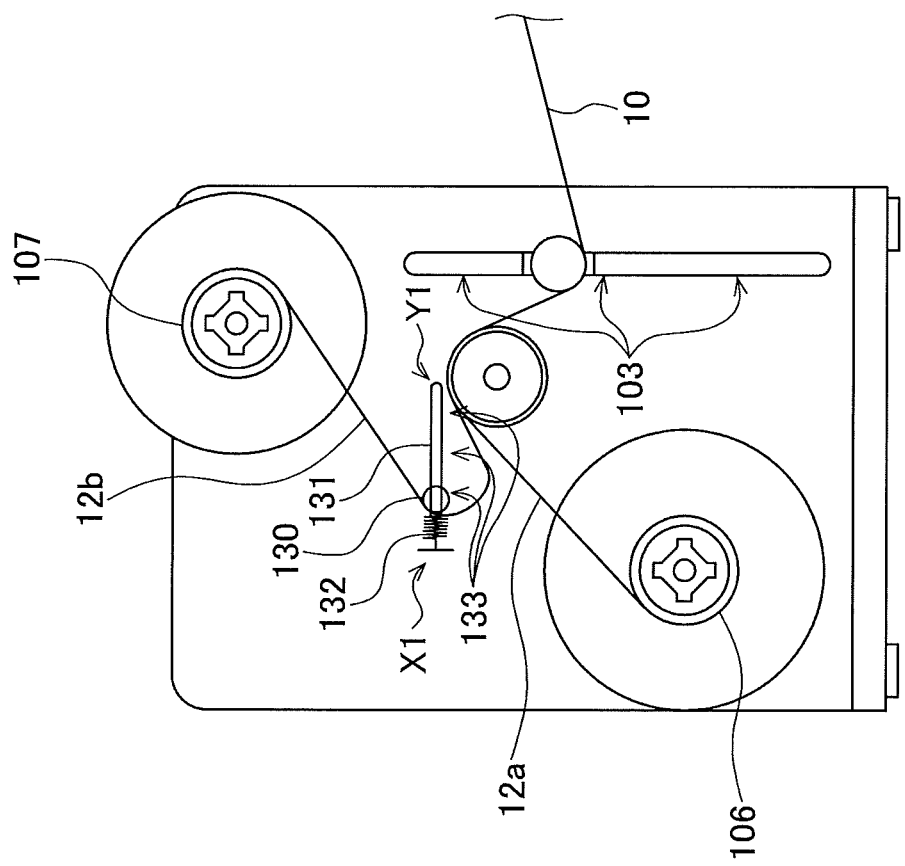

LABEL WINDING DEVICE AND PRINTING SYSTEM

BACKGROUND OF THE INVENTION

1. Field of the Invention

The present invention relates to a label winding device and a printing system, and more particularly, to a label winding device including a waste winder for removing a continuous waste portion after label processing, such as label printing.

2. Description of the Related Art

Japanese Patent Application Publication No. 2008-44171 discloses a label manufacturing apparatus including a printer, a die-cutting device, a separation device, and a winding roller. The printer prints on a surface of a long sheet in which a surface sheet and a release sheet are laminated. The die-cutting device cuts the surface sheet after printing into label portions and a continuous waste portion. The separation device separates the continuous waste portion from the release sheet and winds the continuous waste portion around a waste winding roller. The winding roller winds the release sheet with the label portions into a roll. To prevent the continuous waste portion from breaking during winding, the label manufacturing apparatus further includes an attachment device for attaching reinforcing members to the continuous waste portion between the die-cutting device and the separation device.

However, despite the reinforcement, break of the continuous waste portion may occur. To promptly respond to the waste break, an operator needs to monitor the apparatus.

SUMMARY OF THE INVENTION

An aspect of the present invention is intended to provide a label winding device capable of improving user-friendliness, and a printing system including the label winding device.

According to an aspect of the present invention, there is provided a label winding device for receiving a medium including a label liner and a label member that is removably attached to the label liner and has at least one label portion and a waste portion, separating the waste portion from the label liner at a waste separation portion, and winding the at least one label portion with the label liner, the label winding device including: a waste winder for winding the separated waste portion; a label winder for winding the at least one label portion with the label liner without the separated waste portion; a waste guide for guiding the separated waste portion to the waste winder; a support for rotatably supporting the waste guide; a sensor for detecting a rotational speed of the waste guide; and a waste break detector for detecting break of the waste portion on a basis of the detection by the sensor.

According to another aspect of the present invention, there is provided a label winding device for receiving a medium including a label liner and a label member that is removably attached to the label liner and has at least one label portion and a waste portion, separating the waste portion from the label liner at a waste separation portion, and winding the at least one label portion with the label liner, the label winding device including: a waste winder for winding the separated waste portion; a label winder for winding the at least one label portion with the label liner without the separated waste portion; a waste guide for guiding the separated waste portion to the waste winder; a waste guide installation portion in which the waste guide is slidably disposed; a waste guide position sensor for detecting a position of the waste guide; and a controller for controlling a winding torque of the waste winder and a winding torque of the label winder in accordance with the position detected by the waste guide position sensor.

According to another aspect of the present invention, there is provided a printing system including: one of the above label winding devices; and an image forming apparatus for forming information on the at least one label portion of the label member.

BRIEF DESCRIPTION OF THE DRAWINGS

In the attached drawings:

FIGS. 8A to 8C are schematic views for explaining a configuration of a peeling bar movement limiting frame;

FIGS. 11A and 11B are schematic views for explaining adjustment of a waste winding torque by feedback control;

DETAILED DESCRIPTION OF THE INVENTION

Embodiments of the present invention will now be described with reference to the attached drawings. The present invention is not limited to the following embodiments and may be practiced in various other aspects without departing from the scope of the invention.

First Embodiment

Figure 1:
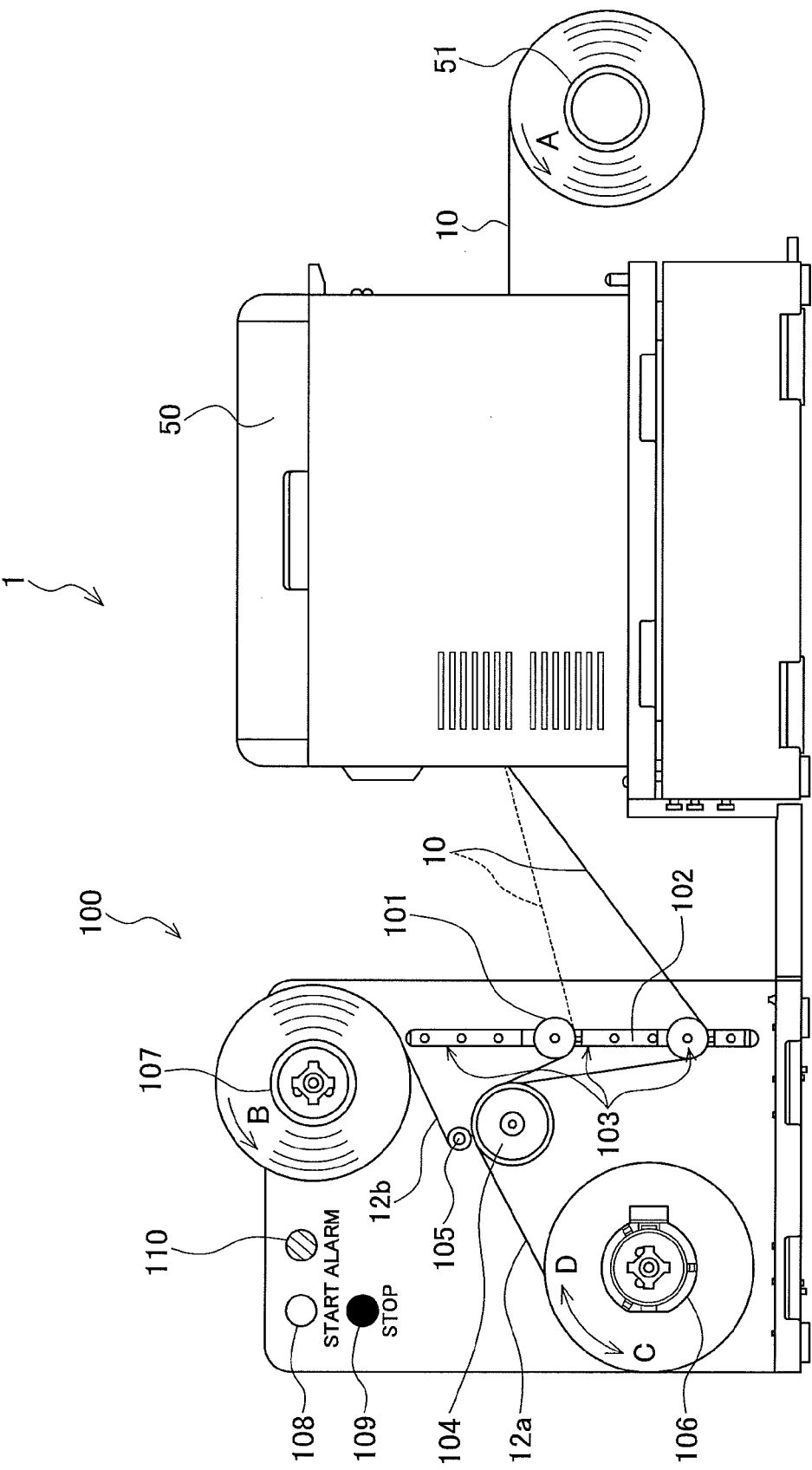
FIG. 1 is an overall view illustrating a configuration of a printing system including a label winding device according to a first embodiment.
Figure 2A:
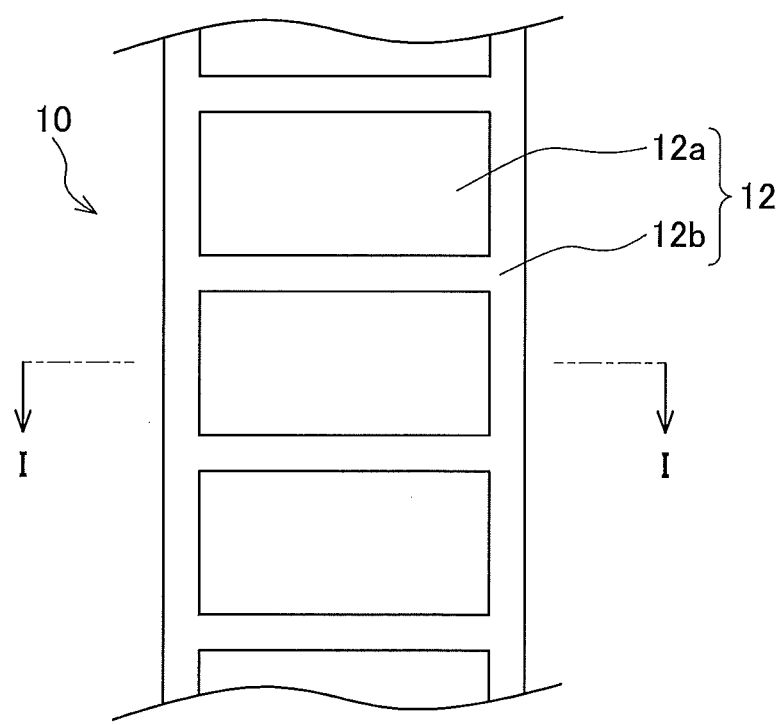
FIG. 2A is a top view of a medium.
Figure 2B:
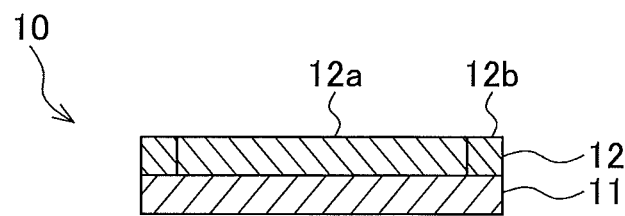
FIG. 2B is a sectional view taken along line I-I of FIG. 2A.

FIG. 1 is an overall view illustrating a configuration of a printing system 1 including a label winding device 100 according to a first embodiment. The printing system 1 includes a printer 50 and the label winding device 100. The printer 50 prints on a medium (or web) 10. As illustrated in FIGS. 2A and 2B, the medium 10 includes a label liner (or backing sheet) 11 and a label member (or label sheet) 12 removably or temporarily attached to the label liner 11. The label member 12 has one or more label portions (or labels) 12a and a waste portion (or continuous waste portion) 12b that is a non-label portion. For example, the medium 10 is cut (or half-cut) so that the label member 12 is cut into the label portions 12a and waste portion 12b without cutting the label liner 11. The printer 50 prints on the label portions 12a of the medium 10. The label winding device 100 receives the medium 10 discharged from the printer 50, separates the waste portion 12b from the label liner 11 of the medium 10 to collect the waste portion 12b, and winds the label portions 12a with the label liner 11.

The printer 50 is an image forming apparatus that includes a print engine, such as an electrophotographic print engine or an inkjet print engine, and other components, and prints arbitrary information on the label portions 12a of the medium 10 supplied from a medium feeder (or paper roll feeder) 51. A roll of the medium 10 (e.g., a paper roll) is set on the medium feeder 51, and is continuously fed into the printer 50 by rotation of the medium feeder 51 in the direction indicated by arrow A in FIG. 1. As described above, the medium 10 includes the label liner 11 and the label member 12 removably attached to a surface of the label liner 11. The label member 12 may be cut before being set on the medium feeder 51, or may be cut in the printer 50.

The label winding device 100 receives the medium 10 discharged from the printer 50, separates the waste portion 12b, which is the non-label portion, from the label liner 11 of the medium 10 to collect the waste portion 12b, and winds the label portions 12a together with the label liner 11. The label winding device 100 includes a tension bar 101 as a label separator, a tension bar movement limiting frame 102, one or more tension bar position sensors 103, an idle roller 104, a peeling bar 105 as a waste guide, a label winder 106, a waste winder 107, a start switch 108, a stop switch 109, and an alarm lamp 110 as an alarm. The label winding device 100 may further include an operation unit 24 for receiving input from an operator, and an interface 25 for communicating with an external device.

The tension bar 101 produces sag in the medium 10 between the printer 50 and the label winder 106, and generates the winding timing. The tension bar 101 is slidable in the tension bar movement limiting frame 102 in the vertical direction in FIG. 1, and absorbs difference in medium conveying speed between the printer 50 and the label winder 106. The tension bar position sensors 103 detect the position of the tension bar 101 in the vertical direction. In this embodiment, if the tension bar position sensors 103 detect that the tension bar 101 is at the lowermost position in the tension bar movement limiting frame 102, a controller 20 (described later) drives a label winding motor 22 (described later) to rotate the label winder 106. On the other hand, if the tension bar position sensors 103 detect that the tension bar 101 is at the uppermost position in the tension bar movement limiting frame 102, the controller 20 stops the label winding motor 22.

The idle roller 104 is disposed downstream of the tension bar 101 in a medium conveying direction, and forms a label winding angle.

The peeling bar 105 is disposed away from the idle roller 104, guides the waste portion 12b to the waste winder 107. The peeling bar 105 forms a waste separation angle for separating the waste portion 12b, the waste separation angle depending on the positional relationship between the peeling bar 105 and the idle roller 104. The peeling bar 105 forms the waste separation angle at a waste separation portion at which the waste portion 12b is separated from the label liner 11. Specifically, the peeling bar 105 separates the medium 10 into the waste portion 12b to be wound around the waste winder 107 and the label portions 12a to be wound around the label winder 106.

The label winder 106 is rotated by driving force transmitted from the label winding motor 22 in either of the directions indicated by arrows C and D in FIG. 1, and winds the label portions 12a together with the label liner 11 of the medium 10 discharged from the printer 50. The label winder 106 winds the label portions 12a with the label liner 11 to form a label roll. The label winder 106 is configured so that its rotational direction can be switched between the directions of arrows C and D depending on whether the label portions 12a (or label liner 11) are wound inward (in a face-in manner) or outward (in a face-out manner).

The waste winder 107 is rotated by driving force transmitted from a waste winding motor 23 (described later) in the direction indicated by arrow B in FIG. 1 and winds the waste portion 12b, which is the non-label portion, of the medium 10 discharged from the printer 50. The waste winder 107 winds the waste portion 12b to form a waste roll.

The start switch 108 is a switch for starting the label winder 106 and waste winder 107. In this embodiment, they are started if the start switch 108 is pressed down and the tension bar 101 is at the lowermost position in the tension bar movement limiting frame 102.

The stop switch 109 is a switch for stopping the label winder 106 and waste winder 107. In this embodiment, if the stop switch 109 is pressed down, the label winder 106 and waste winder 107 stops.

The alarm lamp 110 alerts an operator if a waste break detector (described later) detects break of the waste portion 12b. Specifically, the alarm lamp 110 is a light emitting diode (LED) lamp that lights up if the waste break detector detects break of the waste portion 12b. The alarm is not limited to the LED lamp, and may be an alarm using sound, such as a beep sound, an alarm that displays a message indicating occurrence of waste break on a display (not illustrated), or other alarm means.

Figure 3:
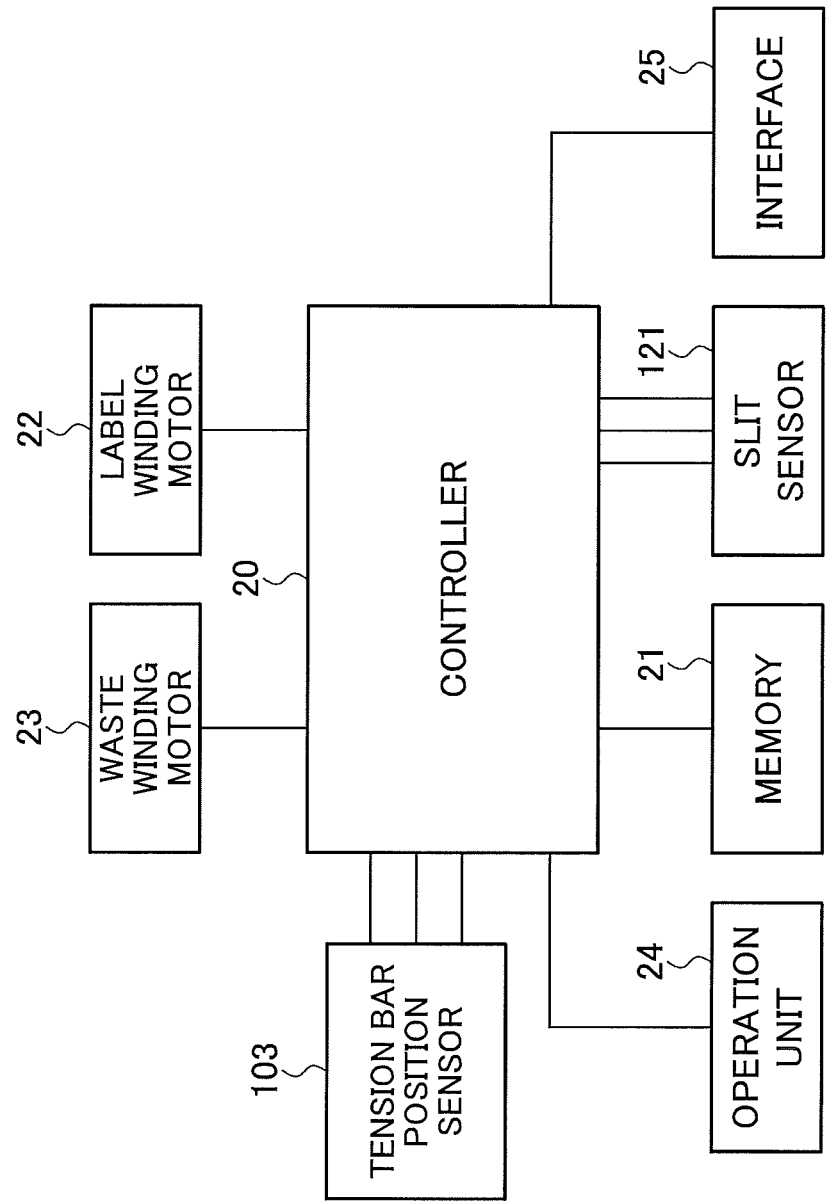
FIG. 3 is a block diagram illustrating a functional configuration of the label winding device according to the first embodiment.

FIG. 3 is a block diagram illustrating a functional configuration of the label winding device 100 according to this embodiment. The label winding device 100 includes a storage unit (or memory) 21, the label winding motor 22, the waste winding motor 23, the tension bar position sensors 103, and a slit sensor 121 as a sensor, which are connected to the controller 20 as the waste break detector.

The storage unit 21 includes a storage device, such as a random access memory (RAM), a hard disk drive (HDD), a flash memory, and a read only memory (ROM). For example, the storage unit 21 temporarily stores sensor input values from the slit sensor 121 (described later) or the like, and stores a control program executed by the controller 20 and other information.

The label winding motor 22 is a driving motor that operates in accordance with instructions from the controller 20 and rotates the label winder 106.

The waste winding motor 23 is a driving motor that operates in accordance with instructions from the controller 20 and rotates the waste winder 107.

The one or more tension bar position sensors 103 are disposed along the tension bar movement limiting frame 102 illustrated in FIG. 1, and output the position of the tension bar 101 in the tension bar movement limiting frame 102 to the controller 20. Based on input from the tension bar position sensors 103, the controller 20 controls start and stop of the label winding motor 22 and the like.

The slit sensor 121 detects the rotational speed or state of the peeling bar 105. The slit sensor 121 is a sensor that outputs a detection signal indicating the rotational state of the peeling bar 105 to the controller 20. The configuration of the slit sensor 121 will be described later with reference to FIG. 4.

The controller 20 controls driving of the label winding motor 22, waste winding motor 23, and the like based on input signals from the tension bar position sensors 103 and slit sensor 121, thereby controlling the operation of the label winding device 100. The controller 20 detects break of the waste portion 12b on the basis of the detection by the slit sensor 121.

Figure 4:
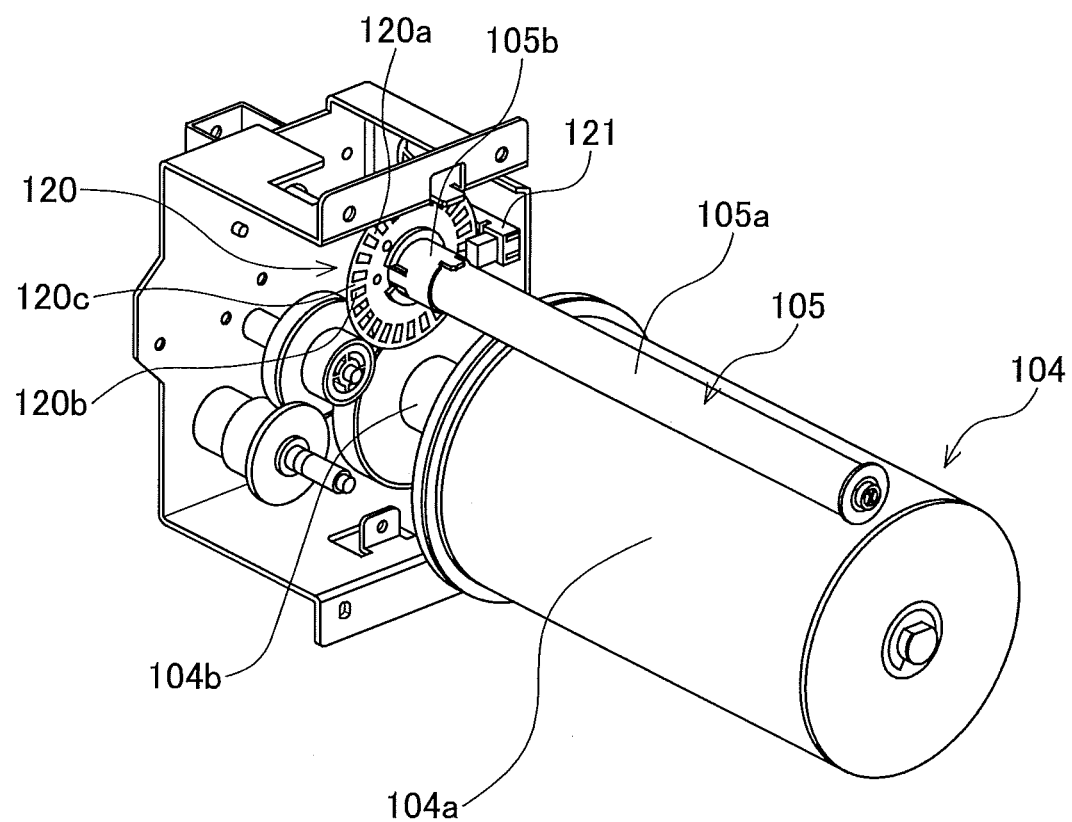
FIG. 4 is an enlarged partial view illustrating an idle roller and a peeling bar.

Next, the configuration of the idle roller 104 and peeling bar 105 in this embodiment will be described with reference to FIG. 4. FIG. 4 is an enlarged partial view illustrating the idle roller 104 and peeling bar 105.

The idle roller 104 includes a roller main body 104a formed in a cylindrical shape and a roller shaft 104b that rotatably supports the roller main body 104a. The idle roller 104 is configured so that it can rotate clockwise or counterclockwise in accordance with movement of the medium 10 due to tension applied to the medium 10 by rotation of the label winder 106 or waste winder 107.

The peeling bar 105 is disposed immediately above the idle roller 104 and guides the waste portion 12b from the medium 10 to the waste winder 107, as described above. The peeling bar 105 includes a bar main body 105a and a support 105b that rotatably supports the bar main body 105a. The peeling bar 105 is connected to a slit plate 120 so that the slit plate 120 rotates with the peeling bar 105. Specifically, the support 105b is connected to the slit plate 120. The slit plate 120 has a disk portion 120a (or a circular portion) having one or more opening portions 120b and one or more non-opening portions (or light blocking portions) 120c. The opening portions 120b are formed at predetermined intervals along a circumferential direction of the disk portion 120a. The non-opening portions 120c are formed between each adjacent pair of the opening portions 120b. The slit sensor 121 detects one of the opening portions 120b and non-opening portions 120c depending on the rotational position of the slit plate 120 and outputs a detection value corresponding to the detected portion to the controller 20. Specifically, the slit sensor 121, serving as a sensor, is disposed across the slit plate 120. The slit sensor 121 detects transmission or non-transmission of light at the opening portions 120b or non-opening portions 120c. Specifically, if the slit sensor 121 detects transmission of light at one of the opening portions 120b of the slit plate 120, it outputs a value "1" as a detection result to the controller 20; if the slit sensor 121 detects non-transmission of light at one of the non-opening portions 120c of the slit plate 120, it outputs a value "0" as a detection result to the controller 20. If the waste portion 12b is normally wound, the peeling bar 105 continues to rotate, so the slit sensor 121 outputs detection values "1" and "0" repeatedly. However, if waste break occurs, the peeling bar 105 and the slit plate 120 connected to the support 105b stop, so the slit sensor 121 constantly outputs a detection value of either "1" or "0". The controller 20 detects that the waste portion 12b has broken if the detection value output from the slit sensor 121 is constant for a predetermined period of time. The controller 20, functioning as the waste break detector, detects occurrence of waste break by monitoring the value output from the slit sensor 121 for a predetermined period of time.

Figure 5:
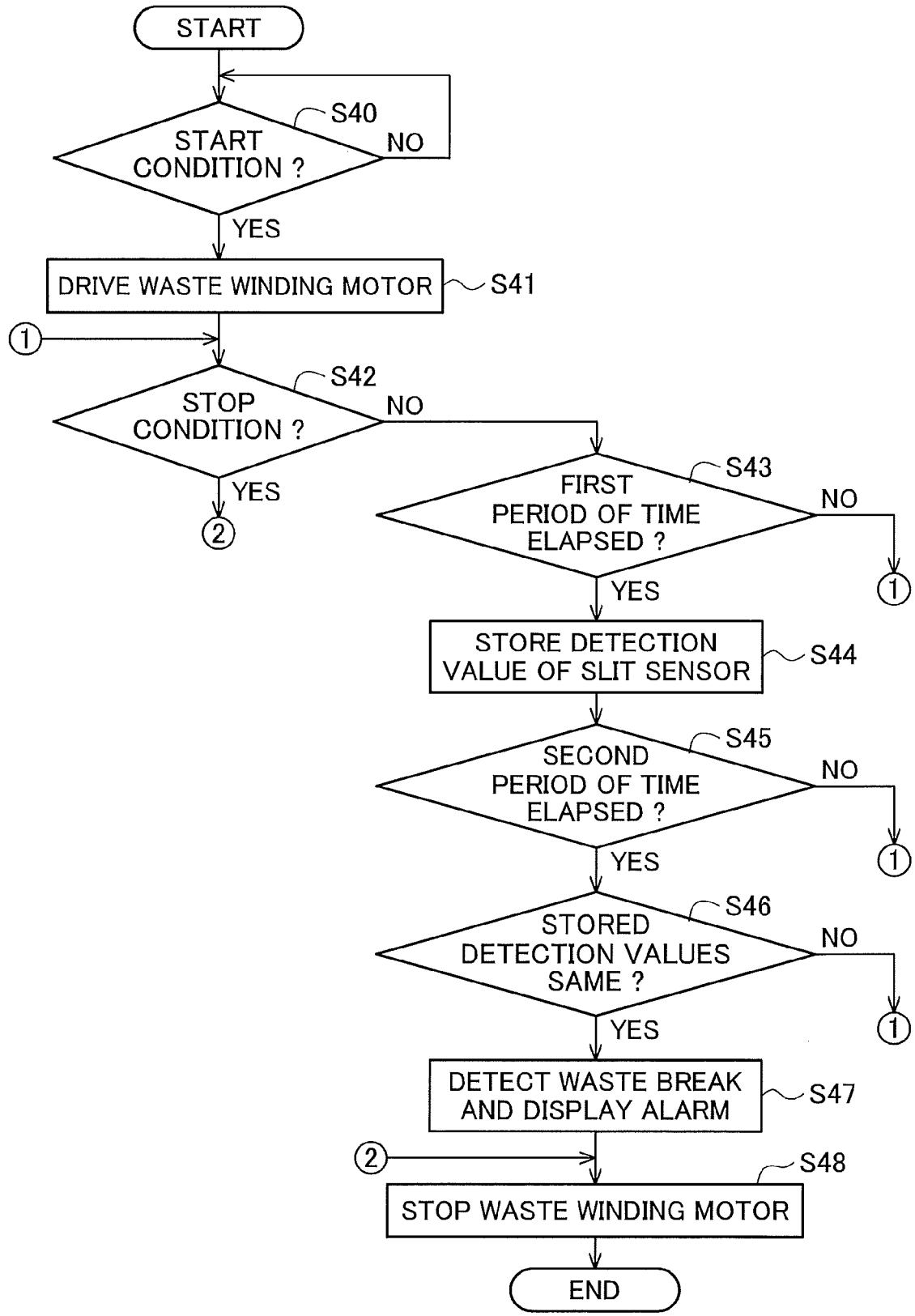
FIG. 5 is a flowchart illustrating the operation of the label winding device according to the first embodiment.

Next, the operation of the printing system 1 according to this embodiment having the above configuration, especially the operation of the label winding device 100, will be described with reference to FIGS. 1 to 4 and the flowchart of FIG. 5.

First, the medium 10 is set on the medium feeder 51 illustrated in FIG. 1, and the printer 100 starts to print on the label portions 12a of the medium 10 (START).

The controller 20 illustrated in FIG. 3 determines whether a start condition is satisfied (step S40). The start condition is satisfied if the start switch 108 of the label winding device 100 illustrated in FIG. 1 is pressed down and the tension bar 101 is at the lowermost position in the tension bar movement limiting frame 102. If the start condition is not satisfied (NO in step S40), the controller 20 waits until the start condition is satisfied. If the start condition is satisfied (YES in step S40), the controller 20 drives the label winding motor 22 to rotate the label winder 106 and drives the waste winding motor 23 to rotate the waste winder 107, thereby starting winding of the label portions 12a and waste portion 12b (step S41). At this time, the controller 20 resets and starts first and second timers, which are included in, for example, the controller 20.

Next, the controller 20 determines whether a stop condition is satisfied (step S42). The stop condition is satisfied if the stop switch 109 of the label winding device 100 illustrated in FIG. 1 is pressed down or if the tension bar 101 is at the uppermost position in the tension bar movement limiting frame 102. If the stop condition is satisfied (YES in step S42), the controller 20 stops the label winding motor 22 and waste winding motor 23 (step S48), thereby stopping winding of the label portions 12a and waste portion 12b, and ending the process (END).

On the other hand, if the stop condition is not satisfied (NO in step S42), the controller 20 determines whether the first timer has measured a first period of time (i.e., a first period of time has elapsed) (step S43). If the first timer has not measured the first period of time (NO in step S43), the process of the controller 20 returns to step S42. If the first timer has measured the first period of time (YES in step S43), the controller 20 stores the detection value ("1" or "0") of the slit sensor 121 in the storage unit 21 (step S44).

The controller 20 then determines whether the second timer has measured a second period of time (i.e., a second period of time has elapsed) (step S45). If the second timer has not measured the second period of time (NO in step S45), the controller 20 resets and starts the first timer, and returns to step S42. If the second timer has measured the second period of time (YES in step S45), the controller 20 determines whether the detection values stored in the storage unit 21 within the second period of time after the start of the second timer are the same (step S46). If the detection values are not the same (NO in step S46), the controller 20 resets and starts the first and second timers, and returns to step S42. On the other hand, if the detection values are the same (YES in step S46), the controller 20 detects stoppage of rotation of the peeling bar 105 illustrated in FIGS. 1 and 4, that is, occurrence of waste break, and turns on the alarm lamp 110 illustrated in FIG. 1 (step S47), and stops the label winding motor 22 and the waste winding motor 23 (step S48), thereby stopping winding of the label portions 12a and waste portion 12b, and ending the process (END). In one preferable example, the first period of time is 5 ms and the second period of time is 10 s. However, the first and second periods of time may be changed or determined appropriately depending on the waste winding speed or the like.

As above, in this embodiment, the label winding device includes the sensor for detecting the rotational state or speed of the waste guide and the waste break detector for detecting break of the waste portion on the basis of the detection by the sensor. This eliminates the need for an operator to monitor the label winding device to detect occurrence of waste break, improving user-friendliness. Further, according to this embodiment, it is possible to detect occurrence of waste break and facilitate reset from the waste break position.

Specifically, the first embodiment has the slit plate provided to the peeling bar for separating the waste portion, detects occurrence of break of the waste portion on the bases of detection of rotation of the slit plate, and stops the waste winding operation. This eliminates the need for an operator to monitor the device, and facilitates reset from the waste break position.

In the aforementioned conventional technique, even though the continuous waste portion is reinforced, waste break is not completely prevented. When no operator is present near the apparatus, if waste break occurs, the waste winding operation cannot be stopped promptly. Thus, the broken waste portion is wound around the winding roller together with the label portions and release sheet. This makes it difficult to find the position at which the waste portion breaks, so that it takes time to reset the waste portion to the waste winding roller.

Further, the conventional technique requires that the waste portion is formed continuously at a given position in the surface sheet. This limits the shape of the waste portion and therefore also limits the shapes of the label portions, so that labels having desired shapes cannot be manufactured. Further, the conventional technique requires the additional mechanism for reinforcing the waste portion, which complicates or enlarges the apparatus, and requires the reinforcing members in addition to the long sheet, resulting in high manufacturing cost.

The first embodiment can solve the problems regarding the process of separating the waste portion from the label member and improve waste winding efficiency.

Second Embodiment

Figure 6:
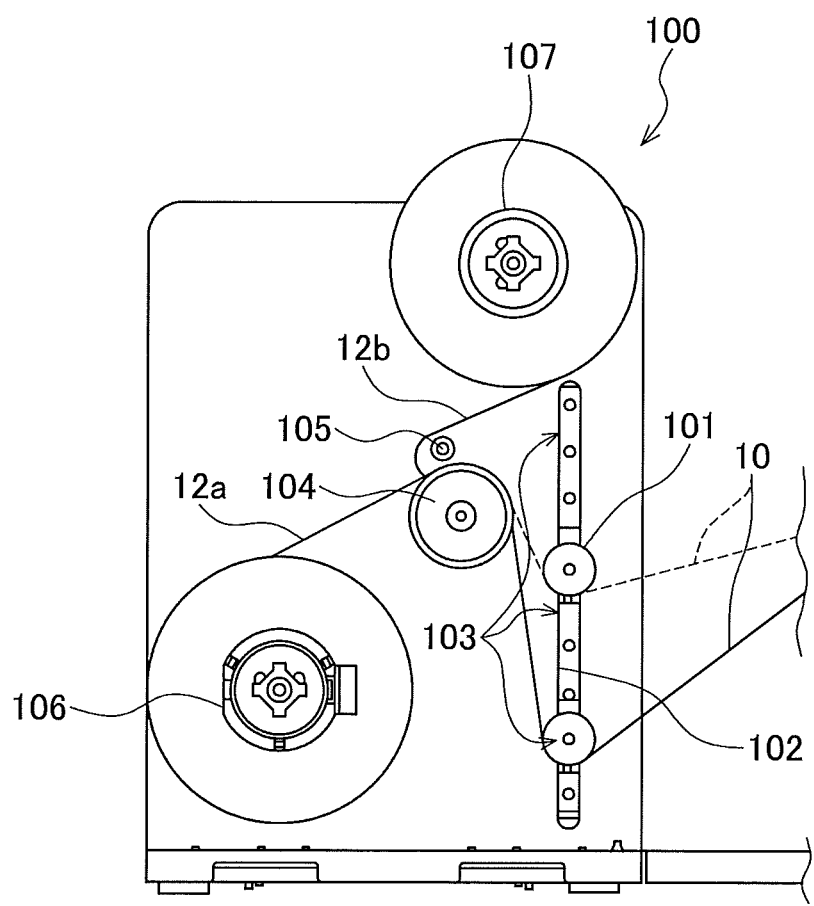
FIG. 6 is a schematic view for explaining occurrence of slack in a waste portion.

In the first embodiment, when the tension applied to the medium 10 by rotation of the label winder 106 is equal to the tension applied to the medium 10 by rotation of the waste winder 107, the label portions 12a and waste portion 12b can be wound while the waste portion 12b is constantly in contact with the peeling bar 105. However, for example, when the tension by the label winder 106 is greater than the tension by the waste winder 107, the waste portion 12b may be pulled toward the label winder 106, become slack, and separate from the peeling bar 105, as illustrated in FIG. 6. In this case, the peeling bar 105 stops, so that even though no waste break occurs, occurrence of waste break may be erroneously detected. The second embodiment can prevent such erroneous detection and correctly detect occurrence of waste break.

Figure 7:
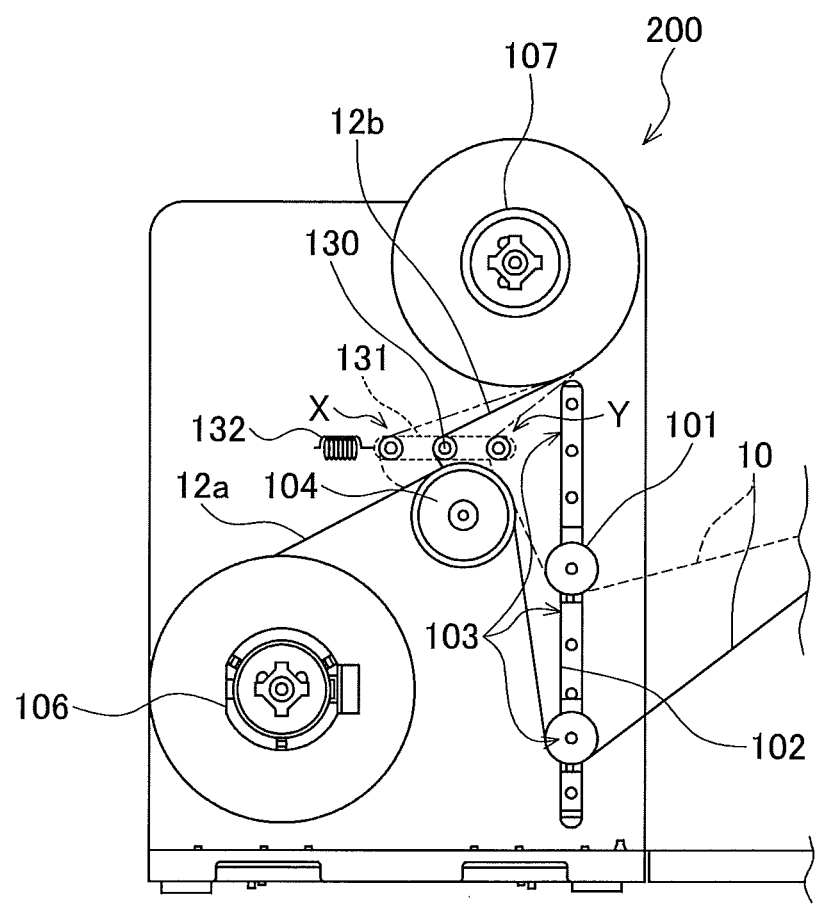
FIG. 7 is a view illustrating a configuration of a label winding device according to a second embodiment.

FIG. 7 is a view illustrating a configuration of a label winding device 200 according to this embodiment. In the following description, parts that are the same as in the first embodiment have the same reference characters, and descriptions thereof will be omitted. As illustrated in FIG. 7, the label winding device 200 includes a peeling bar 130 in place of the peeling bar 105 described in the first embodiment. The label winding device 200 also includes a peeling bar movement limiting frame 131 as a waste guide installation portion in which the peeling bar 130 is slidably disposed, and a tension applying member 132 as an urging member. The peeling bar 130 is disposed in the peeling bar movement limiting frame 131 so that it can slide in accordance with change in tension applied to the medium 10 by the waste winder 107 and change in tension applied to the medium 10 by the label winder 106. The peeling bar movement limiting frame 131 limits the range of movement of the peeling bar 130 The peeling bar movement limiting frame 131 is horizontally disposed. The peeling bar 130 is slidable in the peeling bar movement limiting frame 131 in the left-right direction (horizontal direction) in FIG. 7. The tension applying member 132 urges the peeling bar 130 in the peeling bar movement limiting frame 131 in a predetermined direction (here, toward the position X in FIG. 7).

With the above configuration, for example, when the tension by the waste winder 107 is less than the tension by the label winder 106, the peeling bar 130 abuts the waste portion 12b at the position X in FIG. 7; when the tension by the waste winder 107 is greater than the tension by the label winder 106, the peeling bar 130 abuts the waste portion 12b at the position Y in FIG. 7.

In this manner, the peeling bar 130 slides in the peeling bar movement limiting frame 131 in the left-right direction in FIG. 7 while constantly abutting the waste portion 12b. This can prevent occurrence of slack in the waste portion 12b.

As illustrated in FIG. 8A, the peeling bar movement limiting frame 131 extends across a common tangent line 150 touching both the label roll and the waste roll when the diameter of the label roll is maximum and the diameter of the waste roll is minimum. The peeling bar movement limiting frame 131 is configured so that the peeling bar 130 can slide across the common tangent line 150. The peeling bar movement limiting frame 131 is configured so that the peeling bar 130 can slide toward the position X1 across the tangent line 150 while completely passing through the tangent line 150. Because of variation in adhesion, there is a case where the waste portion 12b is difficult to separate from the medium 10. In this case, as illustrated in FIG. 8B, the point at which the waste portion 12b is separated from the medium 10 may shift toward the label winder 106. As illustrated in FIG. 8C, the point at which the waste portion 12b is separated from the medium 10 shifts toward the label winder 106 at a maximum when the label winder 106 rotates in the direction of arrow C in FIG. 8C, the diameter of the label roll is maximum, and the diameter of the waste roll is minimum, and the waste portion 12b is wound by the label winder 106 without separating from the medium 10. Thus, with the configuration in which the peeling bar 130 can slide completely beyond the tangent line 150 toward the position X1 in FIG. 8A, the peeling bar 130 can always abut the waste portion 12b in all possible conveying paths of the waste portion 12b.

The operation of the label winding device 200 can be the same as in the first embodiment, and description thereof will be omitted here.

Third Embodiment

When the peeling bar 130 is slidable in the peeling bar movement limiting frame 131, it is preferable to perform torque control of the waste winding motor 23 in accordance with the position of the peeling bar 130. This makes it possible to control the peeling bar 130 to be constantly near the center of the peeling bar movement limiting frame 131.

Figure 9:
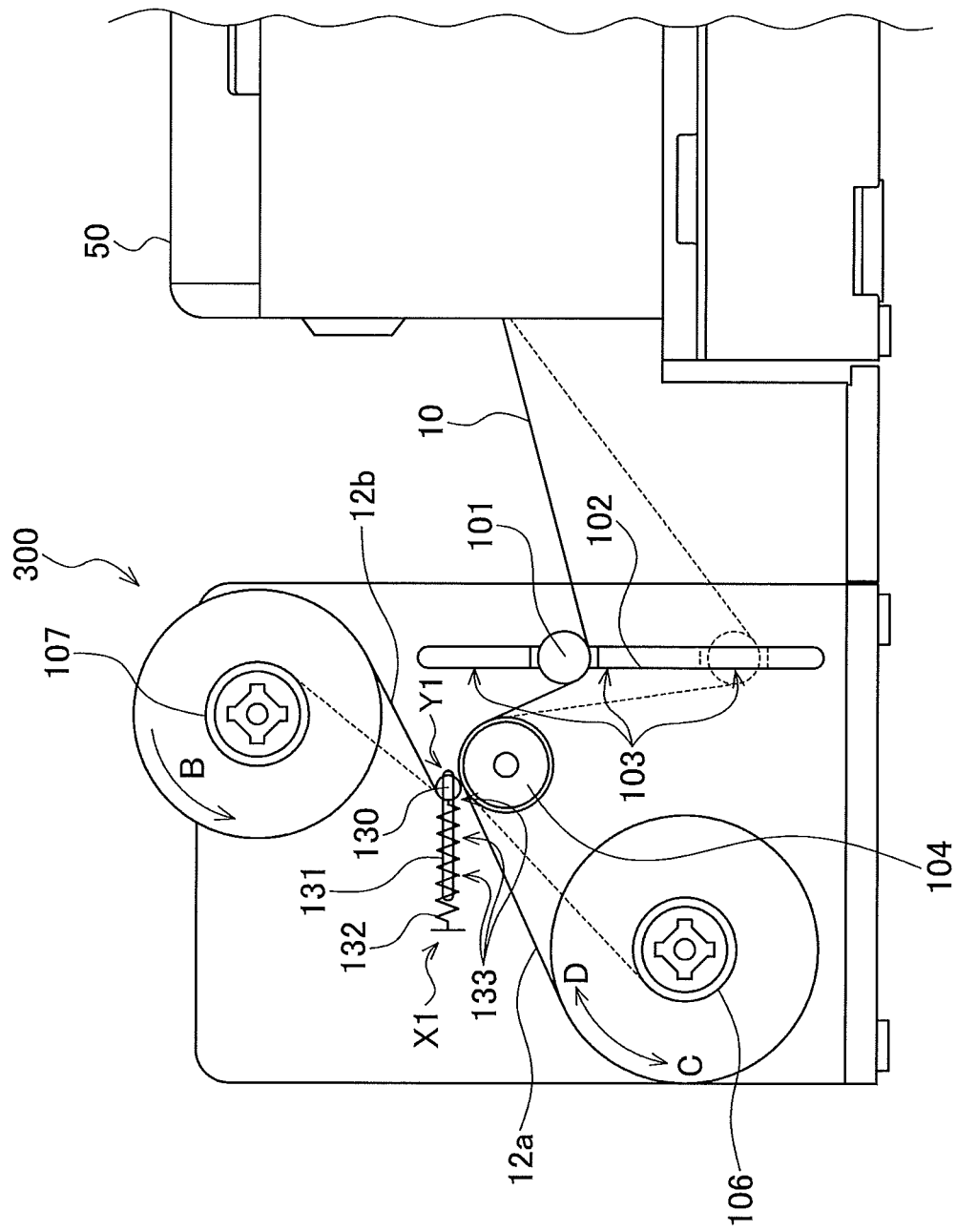
FIG. 9 is a view illustrating a configuration of a label winding device according to a third embodiment.
Figure 10:
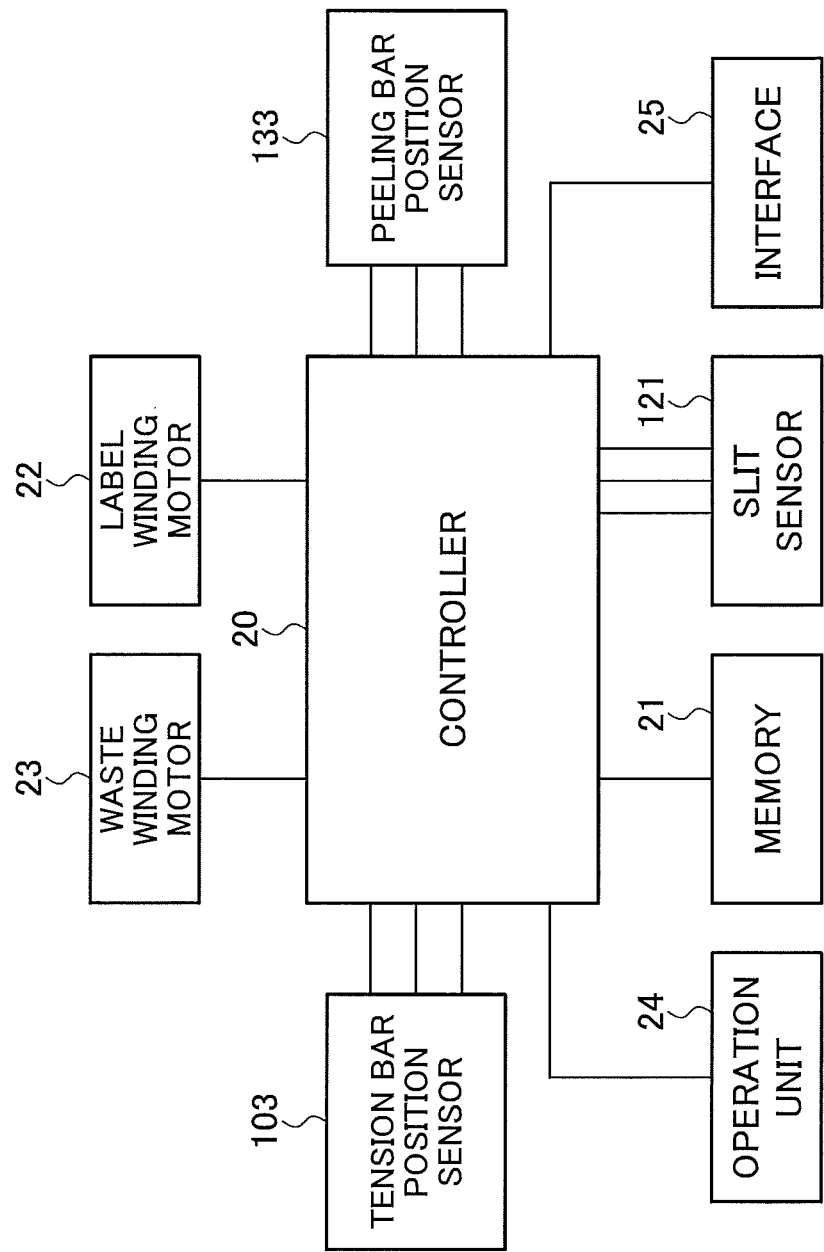
FIG. 10 is a block diagram illustrating a functional configuration of the label winding device according to the third embodiment.

FIG. 9 is a view illustrating a configuration of a label winding device 300 according to a third embodiment. FIG. 10 is a block diagram illustrating a functional configuration of the label winding device 300. In the following description, parts that are the same as in the second embodiment have the same reference characters, and descriptions thereof will be omitted. The label winding device 300 controls the torque of the waste winding motor 23 in accordance with the position of the peeling bar 130. For this control, in addition to the configuration of the label winding device 200 in FIG. 7, the label winding device 300 includes one or more peeling bar position sensors 133 as waste guide position sensors for detecting the sliding position of the peeling bar 130 in the peeling bar movement limiting frame 131. The peeling bar position sensors 133 are disposed along the peeling bar movement limiting frame 131 as the waste guide installation portion. The peeling bar position sensors 133 output the position of the peeling bar 130 in the peeling bar movement limiting frame 131 to the controller 20. The controller 20 controls either or both of the winding torque of the waste winder 107 and the winding torque of the label winder 106 in accordance with the sliding position detected by the peeling bar position sensors 133.

The waste winding motor 23 in FIG. 10 is a motor whose rotating torque can be controlled. Based on input signals from the peeling bar position sensors 133, label material information input via the operation unit 24, or the like, the controller 20 feedback-controls the rotating torque of the waste winding motor 23 so that the peeling bar 130 is constantly near the center of the peeling bar movement limiting frame 131.

Next, the operation of the label winding device 300 will be described. Here, the operation regarding the rotating torque control of the waste winding motor 23 in the label winding device 300 will be described.

The printer 50 starts printing on the label portions 12a of the medium 10, and the label winder 106 and waste winder 107 start to rotate. At this time, the controller 20 starts the waste winding motor 23 at a predetermined torque.

At this time, the peeling bar 130 is pulled by the tension applying member 132 toward the position X1 in FIG. 11A. After starting the waste winding motor 23, the controller 20 monitors the input signals from the peeling bar position sensors 133 and, if the peeling bar 130 is still on the position X1 side of the center of the peeling bar movement limiting frame 131 after a predetermined period of time has elapsed, the controller 20 increases the torque of the waste winding motor 23 in stages. This increases the waste winding speed of the waste winder 107, and the peeling bar 130 begins to move toward the position Y1 in FIG. 11A.

If the peeling bar 130 has slid to the position Y1 side of the center of the peeling bar movement limiting frame 131, as illustrated in FIG. 11B, the controller 20 decreases the torque of the waste winding motor 23. This decreases the waste winding speed of the waste winder 107, and the peeling bar 130 begins to slide toward the position X1. The controller 20 repeats this torque adjustment operation, and performs feedback control so that the peeling bar 130 is constantly near the center of the peeling bar movement limiting frame 131.

According to the third embodiment, it is possible to prevent waste break without reinforcing the waste portion as in the conventional technique.

Specifically, in the third embodiment, the label winding device 300 is configured so that it can detect information indicating the position in the horizontal direction of the peeling bar, which can constantly abut the waste portion, and control the torque of the waste winding motor in accordance with the position information of the peeling bar. This makes it possible to prevent slack in the waste portion, thereby preventing twist of the waste portion occurring due to the slack and concentration of the waste winding torque on a part of the waste portion due to the twist. Further, the torque of the waste winding motor can be feedback-controlled according to the position of the peeling bar. This makes it possible to constantly wind the waste portion at the optimum torque and prevent occurrence of waste break.

The third embodiment adjusts the waste winding torque by feedback control. In general, the medium (label paper) has label portions that are serially formed and have the same shape, and variation in the waste winding torque greatly depends on the shape of the waste portion. Thus, the label winding device 300 may receive information indicating the length of the medium per page via the interface 25 from an upstream device, such as the printer, knowing the length and apply a result of the torque adjustment in the first page to the torque adjustment in pages following the first page. Alternatively, the label winding device 300 may determine the length of the medium per page by detecting periodical variation in the torque, and in pages after the determination, predict torque variation and adjust the waste winding torque by feedback control using the predicted torque variation.

Fourth Embodiment

The label winding device 400 according to the fourth embodiment differs from the label winding device 200 of the second embodiment in the direction in which the peeling bar slides and the position at which the tension applying member is disposed. The label winding device 400 will be described below.

Figure 12:
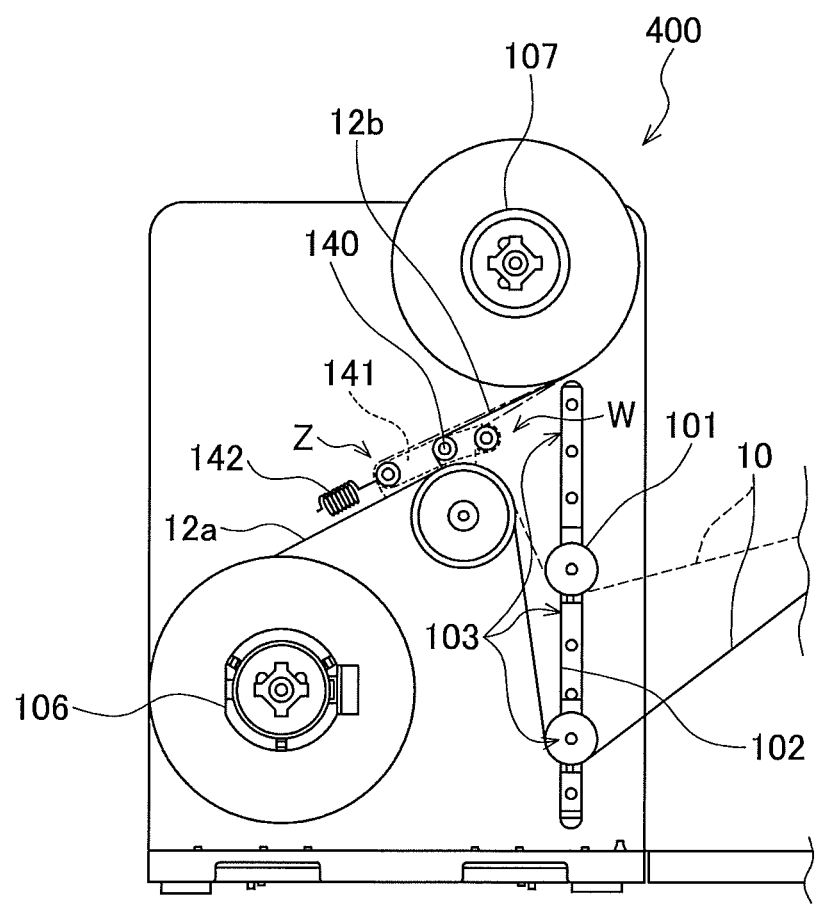
FIG. 12 is a view illustrating a configuration of a label winding device according to a fourth embodiment.

FIG. 12 is a view illustrating a configuration of the label winding device 400 according to this embodiment. In the description of this embodiment, parts that are the same as those described above have the same reference characters, and descriptions thereof will be omitted. As illustrated in FIG. 12, the label winding device 400 includes a peeling bar 140, a peeling bar movement limiting frame 141, and a tension applying member 142. The peeling bar movement limiting frame 141 is disposed so that an angle at which the waste portion 12b is guided to the waste winder 107 by the peeling bar 140 is substantially independent of the sliding position of the peeling bar 140. The peeling bar movement limiting frame 141 is formed so that a winding angle of the waste portion 12b with respect to the peeling bar 140, i.e., a guide angle with respect to the waste winder 107, is substantially constant. The tension applying member 142 is disposed to urge the peeling bar 140 toward the position Z in FIG. 12.

With the above configuration, for example, when the tension by the waste winder 107 is less than the tension by the label winder 106, the peeling bar 140 abuts the waste portion 12b at the position Z in FIG. 12; when the tension by the waste winder 107 is greater than the tension by the label winder 106, the peeling bar 140 abuts the waste portion 12b at the position W in FIG. 12.

The operation of the label winding device 400 can be the same as in the second embodiment, so descriptions thereof will be omitted.

As above, in the fourth embodiment, the peeling bar movement limiting frame is disposed so that the waste winding angle with respect to the peeling bar is substantially constant. This makes it possible to reduce the load on the waste portion as compared to the label winding device 200 according to the second embodiment.

The label winding device 400 in the fourth embodiment may detect the position information of the peeling bar 140 and control the torque of the waste winding motor 23 in accordance with the position information of the peeling bar 140, as in the third embodiment.

As above, the above embodiments can provide a label winding device that can solve problems regarding the process of separating the waste portion from the label member and improve waste winding efficiency and a printing system including the label winding device.

What is claimed is:

1. A label winding device for receiving a medium including a label liner and a label member that is removably attached to the label liner and has at least one label portion and a waste portion, separating the waste portion from the label liner at a waste separation portion, and winding the at least one label portion with the label liner, the label winding device comprising:
   a waste winder for winding the separated waste portion;
   a label winder for winding the at least one label portion with the label liner without the separated waste portion;
   a rotatable waste guide for guiding the separated waste portion to the waste winder;
   a sensor for outputting a detection signal indicating whether the waste guide is rotating; and
   a waste break detector for detecting break of the waste portion on a basis of the detection by the sensor.

2. The label winding device of claim 1, wherein the waste guide forms a waste separation angle at the waste separation portion.

3. The label winding device of claim 1, further comprising a circular slit plate connected to the waste guide so as to rotate with the waste guide, the slit plate including a circular portion having an opening portion and an non-opening portion,
   wherein the sensor is configured to detect one of the opening portion and the non-opening portion depending on a rotational position of the slit plate and output, as a detection value to the waste break detector, a first value when the sensor detects the opening portion and a second value different from the first value when the sensor detects the non-opening portion.

4. The label winding device of claim 3, wherein the waste break detector is configured to detect that the waste portion has broken if the detection value output from the sensor is constant for a predetermined period of time.

5. The label winding device of claim 1, further comprising an alarm for alerting an operator if the waste break detector detects break of the waste portion.

6. The label winding device of claim 1, further comprising a waste guide installation portion in which the waste guide is slidably disposed.

7. The label winding device of claim 6, wherein the waste guide installation portion has a movement limiting frame for limiting a range of movement of the waste guide.

8. The label winding device of claim 7, wherein the movement limiting frame is horizontally disposed.

9. The label winding device of claim 8, wherein:
   the waste winder is configured to wind the waste portion to form a waste roll;
   the label winder is configured to wind the at least one label portion with the label liner to form a label roll; and
   the movement limiting frame extends across a common tangent line touching both the waste roll and the label roll when a diameter of the label roll is maximum and a diameter of the waste roll is minimum.

10. The label winding device of claim 7, wherein the movement limiting frame is disposed so that an angle at which the waste portion is guided to the waste winder by the waste guide is substantially independent of a sliding position of the waste guide.

11. The label winding device of claim 7, further comprising an urging member for urging the waste guide in the movement limiting frame in a predetermined direction.

12. The label winding device of claim 11, wherein the urging member is configured to slide the waste guide in response to a change in tension applied to the medium by the waste winder and a change in tension applied to the medium by the label winder.

13. The label winding device of claim 7, further comprising:
   a waste guide position sensor for detecting a sliding position of the waste guide in the movement limiting frame; and
   a controller for controlling a winding torque of the waste winder in accordance with the sliding position detected by the waste guide position sensor.

14. A label winding device for receiving a medium including a label liner and a label member that is removably attached to the label liner and has at least one label portion and a waste portion, separating the waste portion from the label liner at a waste separation portion, and winding the at least one label portion with the label liner, the label winding device comprising:
   a waste winder for winding the separated waste portion;
   a label winder for winding the at least one label portion with the label liner without the separated waste portion;
   a waste guide for guiding the separated waste portion to the waste winder;
   a waste guide installation portion in which the waste guide is slidably disposed;
   a waste guide position sensor for detecting a position of the waste guide; and
   a controller for controlling a winding torque of the waste winder and a winding torque of the label winder based on the position detected by the waste guide position sensor.

15. A printing system comprising:
   the label winding device of claim 1; and
   a printer for printing information on the at least one label portion of the label member.

16. A printing system comprising:
   the label winding device of claim 14; and
   a printer for printing information on the at least one label portion of the label member.

* * * * *